(12) United States Patent
Sato et al.

(10) Patent No.: US 12,308,047 B2
(45) Date of Patent: May 20, 2025

(54) SPINDLE MOTOR WITH BEARING PART ARRANGEMENT AND DISK DRIVING DEVICE HAVING SAME

(71) Applicant: NIDEC CORPORATION, Kyoto (JP)

(72) Inventors: Kazuhiro Sato, Kyoto (JP); Shingo Suginobu, Kyoto (JP); Junya Mizukami, Kyoto (JP); Masahiro Imahori, Kyoto (JP); Tomoki Uchibori, Kyoto (JP); Naoyuki Kimura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 57 days.

(21) Appl. No.: 18/283,444

(22) PCT Filed: Mar. 31, 2022

(86) PCT No.: PCT/JP2022/016895
§ 371 (c)(1),
(2) Date: Sep. 21, 2023

(87) PCT Pub. No.: WO2022/211105
PCT Pub. Date: Oct. 6, 2022

(65) Prior Publication Data
US 2024/0177736 A1    May 30, 2024

(30) Foreign Application Priority Data

Apr. 1, 2021    (JP) ................. 2021-062979

(51) Int. Cl.
*G11B 19/20* (2006.01)
*F16C 17/10* (2006.01)
*G11B 5/82* (2006.01)
(Continued)

(52) U.S. Cl.
CPC ........ *G11B 19/2009* (2013.01); *F16C 17/105* (2013.01); *G11B 5/82* (2013.01);
(Continued)

(58) Field of Classification Search
None
See application file for complete search history.

(56) References Cited

U.S. PATENT DOCUMENTS 4,864,443 A * 9/1989 Peterson ............ G11B 19/2009
360/99.12
5,305,163 A * 4/1994 Holm ................. G11B 19/2009
360/99.08
(Continued)

FOREIGN PATENT DOCUMENTS

DE    102017119497    2/2019
JP    H04112645    4/1992
(Continued)

OTHER PUBLICATIONS

"International Search Report (Form PCT/ISA/210) of PCT/JP2022/016895", mailed on Jun. 21, 2022, with English translation thereof, pp. 1-4.

*Primary Examiner* — Craig A. Renner
(74) *Attorney, Agent, or Firm* — JCIPRNET

(57) ABSTRACT

A spindle motor includes a shaft, a base part, a stator core, a rotor, and a bearing part. The shaft extends along a center axis extending in the vertical direction and has a screw hole extending axially downward from the upper end thereof. The screw hole has a screw part onto which a screw is screwed. The bearing part includes an upper annular member, a lower annular member, and a sleeve. The upper annular member and the lower annular member protrude radially outward from an outer peripheral surface of the shaft and are disposed to be spaced apart from each other in the axial direction. The sleeve covers the outer peripheral surface of the shaft, extends in the axial direction, and is defined in a cylindrical shape. The upper end of the upper annular member is disposed lower than the lower end of the screw part in the axial direction.

15 Claims, 5 Drawing Sheets

(51) Int. Cl.
   *H02K 5/167* (2006.01)
   *H02K 5/24* (2006.01)

(52) U.S. Cl.
   CPC .......... *G11B 19/20* (2013.01); *G11B 19/2036* (2013.01); *H02K 5/1677* (2013.01); *H02K 5/24* (2013.01); *F16C 2370/12* (2013.01)

(56) References Cited

U.S. PATENT DOCUMENTS

| | | | | |
|---|---|---|---|---|
| 5,729,404 | A * | 3/1998 | Dunfield et al. ... | G11B 19/2009 360/99.08 |
| 6,307,291 | B1 * | 10/2001 | Iwaki et al. ....... | G11B 19/2009 310/90 |
| 6,371,650 | B1 * | 4/2002 | Goto et al. ......... | G11B 19/2009 384/110 |
| 7,213,972 | B2 * | 5/2007 | Grantz ............... | G11B 19/2018 384/110 |
| 8,144,423 | B2 | 3/2012 | Sekii et al. | |
| 8,593,756 | B2 | 11/2013 | Sugi et al. | |
| 8,879,200 | B2 | 11/2014 | Sugi et al. | |
| 8,879,201 | B2 | 11/2014 | Sugi et al. | |
| 9,047,925 | B2 | 6/2015 | Sugi et al. | |
| 9,058,833 | B1 * | 6/2015 | Sugi et al. ......... | G11B 19/2009 |
| 9,086,858 | B2 * | 7/2015 | Hirano et al. ..... | G11B 19/2036 |
| 9,190,880 | B2 * | 11/2015 | Sugi et al. ......... | G11B 19/2009 |

FOREIGN PATENT DOCUMENTS

| | | |
|---|---|---|
| JP | H09182357 | 7/1997 |
| JP | 2007185073 | 7/2007 |
| JP | 2009216183 | 9/2009 |
| JP | 2012152098 | 8/2012 |

* cited by examiner

# SPINDLE MOTOR WITH BEARING PART ARRANGEMENT AND DISK DRIVING DEVICE HAVING SAME

CROSS-REFERENCE TO RELATED APPLICATIONS

This is the U.S. national stage of application No. PCT/JP2022/016895, filed on Mar. 31, 2022, and priority under 35 U.S.C. § 119(a) and 35 U.S.C. § 365(b) is claimed from Japanese Application No. 2021-062979, filed Apr. 1, 2021; the disclosures of which are incorporated herein by reference.

TECHNICAL FIELD

The present invention relates to a spindle motor and a disk driving device having the same.

BACKGROUND ART

A spindle motor of the related art includes a shaft part that extends along a vertically extending center axis, a bracket main body (a base part), a hub member (a rotor), and a bearing means (a bearing part). The shaft part is fixed to the bracket main body. The bearing means rotatably supports the hub member with the shaft part as a center axis. The shaft part has a clamp hole (a screw hole) which extends axially downward from an upper end thereof and into which an attachment screw is screwed.

However, in the spindle motor disclosed in the related art, when the attachment screw is screwed into the clamp hole, there is a possibility of the vicinity of the clamp hole of the shaft part being deformed and the shaft center being displaced, resulting in shaft wobbling.

SUMMARY

An exemplary spindle motor of the present invention includes a shaft, a base part, a stator core, a rotor, and a bearing part. The shaft extends along a center axis extending in the vertical direction. The base part has a through hole to which a lower end portion of the shaft is fixed. The stator core is disposed on an upper surface of the base part and surrounds the shaft. The rotor rotates around the center axis. The bearing part rotatably supports the rotor with the shaft as a center axis. The shaft has a screw hole extending axially downward from the upper end thereof. The screw hole has a screw part onto which a screw is screwed. The bearing part includes an upper annular member, a lower annular member, and a sleeve. The upper annular member and the lower annular member protrude radially outward from an outer peripheral surface of the shaft and are disposed to be spaced apart from each other in the axial direction. The sleeve has an insertion hole into which the shaft is inserted. The sleeve covers the outer peripheral surface of the shaft, extends in the axial direction, and is defined in a cylindrical shape. The upper end of the upper annular member is disposed lower than the lower end of the screw part in the axial direction.

The above and other elements, features, steps, characteristics and advantages of the present disclosure will become more apparent from the following detailed description of the preferred embodiments with reference to the attached drawings.

DESCRIPTION OF EMBODIMENTS

An exemplary embodiment of the present invention will be described in detail below with reference to the drawings. In the present application, a direction parallel to a center axis C is called an "axial direction," a direction orthogonal to the center axis C is called a "radial direction," and a direction along an arc centered on the center axis C is called a "circumferential direction." In addition, in the present application, the shape and positional relationship of each part will be described with the axial direction as a vertical direction and a cover part side as an upper side with respect to a base part. However, this definition of the vertical direction is not intended to limit the orientation of a motor and a disk driving device 1 according to the present invention when in use.

(1. Configuration of Disk Driving Device)

Figure 1:
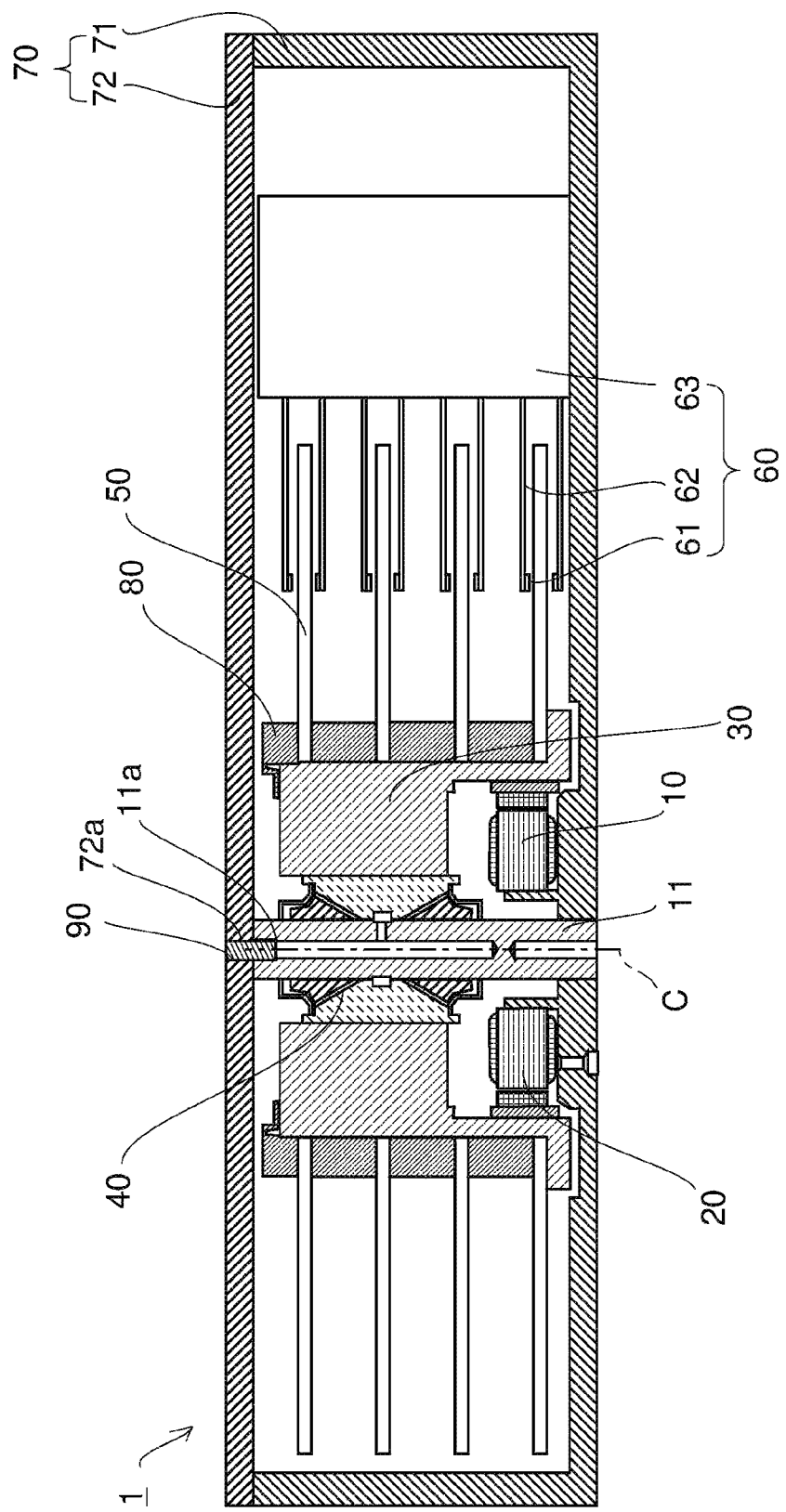
FIG. 1 is a longitudinal sectional view of a disk driving device according to an embodiment of the present invention.

A disk driving device 1 according to an exemplary embodiment of the present invention will be described. FIG. 1 is a longitudinal sectional view of the disk driving device 1 according to the embodiment of the present invention.

The disk driving device 1 is a hard disk drive. The disk driving device 1 includes a spindle motor 10, a disk 50, an access part 60, and a housing 70.

The housing 70 houses the spindle motor 10, the disk 50, and the access part 60 inside. The inside of the housing 70 is filled with a gas having a density lower than that of air. Specifically, the inside of the housing 70 is filled with helium gas. The inside of the housing 70 may be filled with hydrogen gas or the like instead of helium gas.

The housing 70 has a base part 71 and a cover part 72. The base part 71 is defined by casting a metal die-cast member defined by an aluminum alloy. A metal other than an aluminum alloy may be used for the die-cast member. The cover part 72 is defined by a metal formed by press working.

The disk 50, the spindle motor 10, and the access part 60 are disposed on the base part 71 inside the housing 70. The base part 71 has side walls surrounding its sides and opens on its top surface. An upper opening of the base part 71 is closed by the cover part 72.

The disk 50 is a disk-shaped information recording medium having a hole in the center. Each disk 50 is mounted on the spindle motor 10, and the disks 50 are disposed in parallel with each other in the axial direction at equal intervals via spacers 80.

The access part 60 performs at least one of reading and writing information with respect to the disk 50. Specifically, the access part 60 has a head 61, an arm 62, and a head moving mechanism 63. The head 61 magnetically performs reading or writing of information with respect to the disk 50. The arm 62 supports the head 61. The head moving mechanism 63 moves the head 61 with respect to the disk 50 by moving the arm 62.

(2. Configuration of Spindle Motor)

Figure 2:
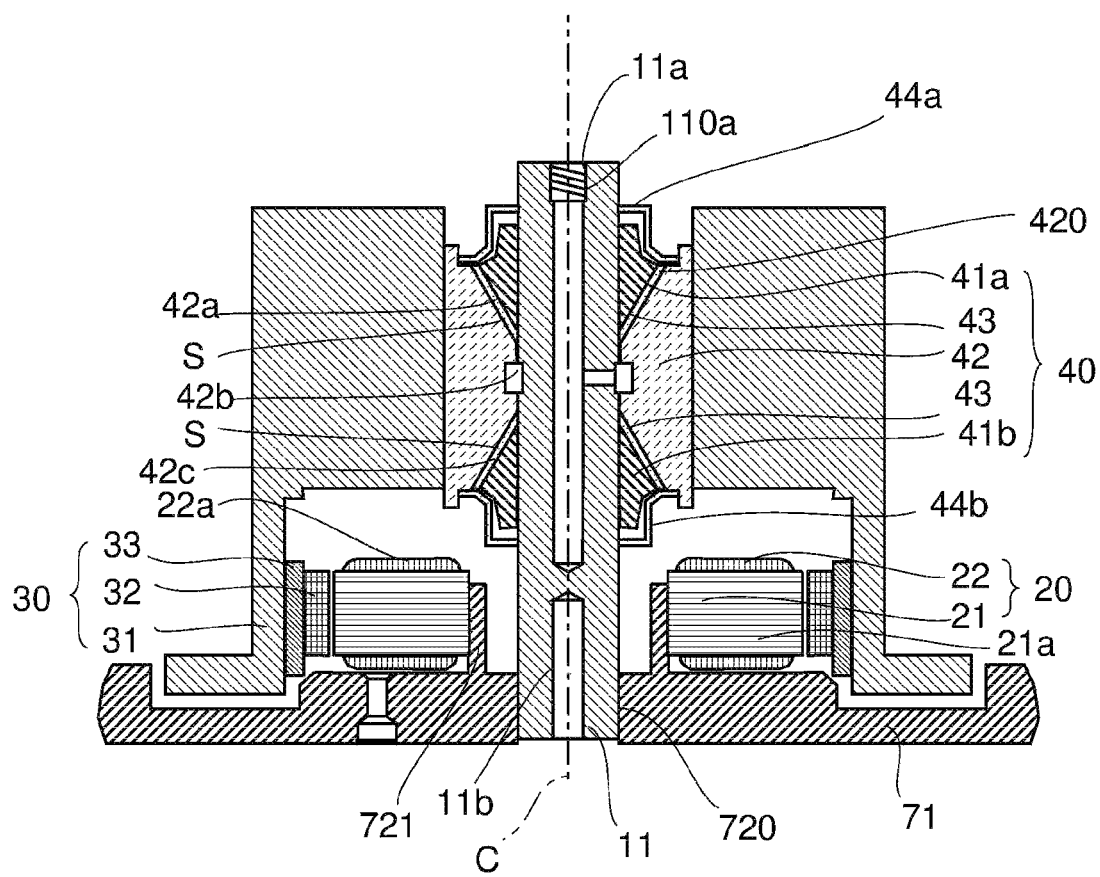
FIG. 2 is a longitudinal sectional view of a motor according to the embodiment of the present invention.

FIG. 2 is a longitudinal sectional view of the spindle motor 10. The spindle motor 10 rotates the disk 50 about the center axis C while supporting the disk 50. The spindle motor 10 includes a shaft 11, a stator 20, a rotor 30, a bearing part 40, and the base part 71.

The base part 71 is a portion of the housing 70 and also a portion of the spindle motor 10. The base part 71 has a through hole 720 penetrating in the axial direction and a cylindrical annular protruding portion 721 that protrudes axially upward from the upper surface thereof and surrounds the shaft 11. The through hole 720 is disposed on the center axis C.

The shaft 11 is a columnar member that extends along the center axis C extending in the vertical direction. The lower end portion of the shaft 11 is press-fitted into the through hole 720 and fixed thereto. As a result, the shaft 11 and the base part 71 are fixed to each other. The shaft 11 has a screw hole 11a extending axially downward from the upper end thereof. The screw hole 11a has a screw part 110a onto which a screw 90 is screwed. The screw part 110a is defined by cutting, for example, and may be defined in either a female screw shape or a male screw shape depending on the shape of the screw to be screwed.

The screw hole 11a and a cover screw hole 72a provided in the cover part 72 overlap each other in the axial direction and are screwed to each other via the screw 90 (see FIG. 1). As a result, the shaft 11 and the cover part 72 are fixed to each other. The cover screw hole 72a may be a through hole that is not threaded.

Further, the shaft 11 has a hollow hole 11b extending axially upward from the lower end thereof. As a result, the moment of inertia of area at the lower end portion of the shaft 11 is reduced. Therefore, the load required when the shaft 11 is press-fitted into the through hole 720 is reduced, and press-fitting workability is improved. Further, the upper end of the hollow hole 11b is disposed higher than the upper end of the through hole 720 in the axial direction. As a result, when the shaft 11 is press-fitted into the through hole 720, the press-fitting workability is further improved.

Moreover, since the load required when the shaft 11 is press-fitted into the through hole 720 is reduced, deformation of the shaft 11 and the through hole 720 due to the press-fitting load is able to be prevented. The shaft 11 preferably has an outer diameter of 5.5 mm or more and 7.0 mm or less. As a result, it is possible to prevent the shaft 11 from tilting with respect to the base part 71 while ensuring the rigidity of the shaft 11.

The stator 20 surrounds the lower portion of the shaft 11 and is fixed to the base part 71. The stator 20 has a stator core 21 in an annular shape and a plurality of coils 22. The stator core 21 is an annular stacked structure in which a plurality of magnetic bodies is stacked. The stator core 21 is disposed on the upper surface of the base part 71 and surrounds the shaft 11. Specifically, the inner peripheral surface of the stator core 21 is press-fitted to the outer peripheral surface of the annular protruding portion 721.

The upper end of the hollow hole 11b is disposed at a position overlapping the annular protruding portion 721 and the stator core 21 in the radial direction. As a result, it is possible to reduce deformation of the annular protruding portion 721 disposed around the through hole 720 during press-fitting. Therefore, it is possible to reduce the occurrence of shaft wobbling of the stator core 21 supported by the annular protruding portion 721.

The stator core 21 has a plurality of teeth 21a protruding radially outward. The plurality of coils 22 is constituted by a conducting wire 22a wound around the teeth 21a.

The rotor 30 has a hub member 31, a magnet 32, and a yoke 33. The hub member 31 is defined in a cylindrical shape, and a sleeve 42 is fixed to the inside of the hub member 31.

The yoke 33 is defined in an annular shape and is fixed to the lower inner peripheral surface of the hub member 31. The magnet 32 is attached to the inner peripheral surface of the yoke 33. As a result, the magnet 32 is held by the hub member 31 via the yoke 33. The inner peripheral surface of the magnet 32 is a magnetic pole surface and faces the outer peripheral surfaces of the plurality of teeth 21a in the radial direction. In a case where the hub member 31 is defined by a magnetic material (for example, SUS), the magnet 32 may be directly fixed to the inner peripheral surface of the hub member 31, and the yoke 33 may be omitted.

The bearing part 40 is a conical fluid dynamic pressure bearing that supports the rotor 30 rotatably around the center axis C. That is, the bearing part 40 rotatably supports the rotor 30 with the shaft 11 as the center axis, and the rotor 30 rotates around the center axis C. The bearing part 40 includes an upper annular member 41a, a lower annular member 41b, and the sleeve 42.

The upper annular member 41a and the lower annular member 41b are fixed to the outer peripheral surface of the shaft 11 by press-fitting or the like and protrude radially outward from the outer peripheral surface. The upper annular member 41a and the lower annular member 41b are vertically fixed to the outer peripheral surface of the shaft 11 at a distance from each other in the axial direction. That is, the upper annular member 41a and the lower annular member 41b protrude radially outward from the outer peripheral surface of the shaft 11 and are disposed to be spaced apart from each other in the axial direction.

The outer peripheral surfaces of the upper annular member 41a and the lower annular member 41b, which face the sleeve 42 in the radial direction, are substantially conical. The diameter of the lower portion of the upper annular member 41a gradually decreases downward, and the diameter of the upper portion of the lower annular member 41b gradually decreases upward.

The upper end of the upper annular member 41a is disposed lower than the lower end of the screw part 110a in the axial direction. When the upper annular member 41a is disposed lower than the screw part 110a in the axial direction, it is possible to reduce deformation of the bearing part 40 due to screwing into the screw hole 11a. As a result, it is possible to prevent the shaft wobbling. Therefore, when the spindle motor 10 is driven, it is possible to suppress the occurrence of vibration and noise due to the shaft wobbling.

Further, when the upper annular member 41a is disposed lower than the lower end of the screw part 110a in the axial direction, the center of gravity of the rotor 30 is able to be disposed close to the central portion of the disk driving device 1 in the axial direction. As a result, the rotational stability of the spindle motor 10 is improved, and deterioration of the vibration performance of the disk driving device 1 is able to be suppressed.

In addition, the radially inner end of the annular protruding portion 721 overlaps at least a portion of the upper annular member 41a and the lower annular member 41b when viewed in the axial direction. In the present embodiment, the radially inner end of the annular protruding portion 721 is positioned further radially inward than the radially outer ends of the upper annular member 41a and the lower annular member 41b. As a result, the stator core 21 is able to be disposed on the base part 71 while being enlarged in the radial direction. Therefore, the torque of the spindle motor 10 is able to be improved.

The lower end of the lower annular member 41b is disposed higher than the upper end of the hollow hole 11b and the upper end of the stator core 21 in the axial direction. When the lower annular member 41b is disposed higher than the hollow hole 11b and the stator core 21 in the axial direction, it is possible to reduce deformation of the bearing part 40 when the shaft 11 is press-fitted into the through hole 720. As a result, it is possible to further reduce the shaft wobbling.

The sleeve 42 has an insertion hole 420 into which the shaft 11 is inserted and is defined in a cylindrical shape. The sleeve 42 covers the outer peripheral surface of the shaft 11 and extends in the axial direction. The sleeve 42 has an upper inner peripheral surface 42a, a middle inner peripheral surface 42b, and a lower inner peripheral surface 42c in that order from above. The upper inner peripheral surface 42a is inclined upward (axially upward) in a direction away from the shaft 11 and radially faces the outer peripheral surface of the upper annular member 41a. The middle inner peripheral surface 42b is defined along the center axis C and faces the outer peripheral surface of the shaft 11. The lower inner peripheral surface 42c is inclined downward (axially downward) in a direction away from the shaft 11 and radially faces the outer peripheral surface of the lower annular member 41b.

Further, the sleeve 42 has a minute gap S between the upper annular member 41a and the shaft 11, and between the lower annular member 41b and the shaft 11. The sleeve 42 may be defined integrally with the hub member 31.

A seal part 44a is attached to the upper surface of the sleeve 42, and a seal part 44b is attached to the lower surface of the sleeve 42. The seal parts 44a and 44b enclose a lubricating oil 43 in the minute gap S. The minute gap S may be filled with a fluid such as a gas instead of the lubricating oil.

Figure 3:
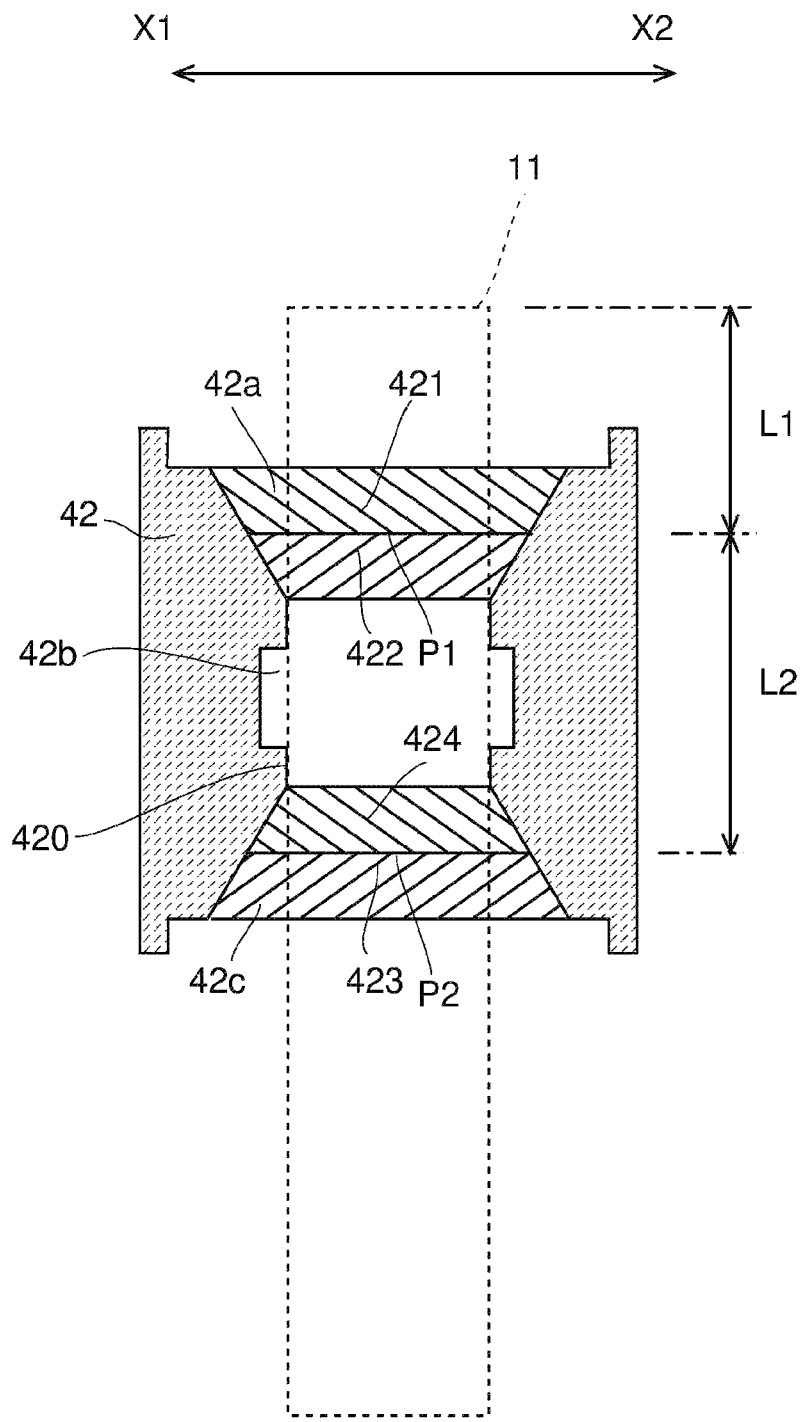
FIG. 3 is a longitudinal sectional view of a motor according to the embodiment of the present invention.

FIG. 3 is a longitudinal sectional view of the sleeve 42 and shows the shaft 11 in a broken line. The upper inner peripheral surface 42a has first dynamic pressure grooves 421 and second dynamic pressure grooves 422 which are disposed adjacent to each other in the axial direction. The first dynamic pressure grooves 421 and the second dynamic pressure grooves 422 are inclined axially upward in different directions in the circumferential direction. In the present embodiment, the first dynamic pressure grooves 421 are disposed at an upper portion of the upper inner peripheral surface 42a in the axial direction and are defined in plurality in the circumferential direction so as to be inclined axially upward and toward one side X1 in the circumferential direction. The second dynamic pressure grooves 422 are disposed lower than the first dynamic pressure grooves 421 in the axial direction and are defined in plurality in the circumferential direction so as to be inclined axially upward and toward the other side X2 in the circumferential direction.

The lower inner peripheral surface 42c has third dynamic pressure grooves 423 and fourth dynamic pressure grooves 424 which are disposed adjacent to each other in the axial direction. The third dynamic pressure grooves 423 and the fourth dynamic pressure grooves 424 are inclined axially upward in different directions in the circumferential direction. In the present embodiment, the third dynamic pressure grooves 423 are disposed at a lower portion of the lower inner peripheral surface 42c in the axial direction and are defined in plurality in the circumferential direction so as to be inclined axially upward and toward the other side X2 in the circumferential direction. The fourth dynamic pressure grooves 424 are disposed higher than the third dynamic pressure grooves 423 in the axial direction and are defined in plurality in the circumferential direction so as to be inclined axially upward and toward the one side X1 in the circumferential direction.

In the present embodiment, the first dynamic pressure grooves 421 and the fourth dynamic pressure grooves 424 are defined so as to be inclined axially upward and toward the one side X1 in the circumferential direction, but the first dynamic pressure grooves 421 and the fourth dynamic pressure grooves 424 may be defined so as to be inclined axially upward and toward the other side X2 in the circumferential direction. At this time, the second dynamic pressure grooves 422 and the third dynamic pressure grooves 423 are defined so as to be inclined axially upward and toward the one side X1 in the circumferential direction.

The first dynamic pressure grooves 421, the second dynamic pressure grooves 422, the third dynamic pressure grooves 423, and the fourth dynamic pressure grooves 424 induce a fluid dynamic pressure in the lubricating oil 43 when the rotor 30 rotates.

In the present embodiment, the first dynamic pressure grooves 421 and the second dynamic pressure grooves 422 are defined on the upper inner peripheral surface 42a, but the first dynamic pressure grooves 421 and the second dynamic pressure grooves 422 may be defined on the outer peripheral surface of the upper annular member 41a that faces the upper inner peripheral surface 42a in the radial direction.

Further, in the present embodiment, the third dynamic pressure grooves 423 and the fourth dynamic pressure grooves 424 are defined on the lower inner peripheral surface 42c, but the third dynamic pressure grooves 423 and the fourth dynamic pressure grooves 424 may be defined on the outer peripheral surface of the lower annular member 41b that faces the lower inner peripheral surface 42c in the radial direction.

In a case where the outer diameter of the shaft 11 is 5.5 mm or more and less than 6.5 mm, a distance L1 in the axial direction between a boundary P1 between the first dynamic pressure grooves 421 and the second dynamic pressure grooves 422 and the upper end of the shaft 11 is preferably 0.60 times or more and 0.85 times or less a distance L2 in the axial direction between the boundary P1 and a boundary P2 between the third dynamic pressure grooves 423 and the fourth dynamic pressure grooves 424. Further, in a case where the outer diameter of the shaft 11 is 6.5 mm or more and 7.0 mm or less, the distance L1 is preferably 0.50 times or more and 0.80 times or less the distance L2. At this time, the distance L1 is preferably 8.5 mm or more.

In a case where the outer diameter of the shaft 11 is 5.5 mm or more and less than 6.5 mm and the distance L1 is more than 0.85 times the distance L2, or in a case where the outer diameter of the shaft 11 is 6.5 mm or more and 7.0 mm or less and the distance L1 is more than 0.80 times the distance L2, the distance L1 increases, and in the disk driving device 1, the distance between the upper end of the shaft 11 fixed to the cover part 72 and the upper annular member 41a increases. As a result, in the upper portion of the shaft 11, the supporting rigidity of the shaft 11 with respect to the rotor 30 is reduced, and when the spindle motor 10 is driven, vibration and noise increase (excitation response deteriorates). In addition, in a case where the distance L1 increases and the center of gravity of the rotor 30 is disposed apart from and lower than the axially central portion of the disk driving device 1 in the axial direction, the rotational stability of the spindle motor 10 is reduced and the excitation response further deteriorates.

On the other hand, in a case where the outer diameter of the shaft 11 is 5.5 mm or more and less than 6.5 mm and the distance L1 is less than 0.60 times the distance L2, or in a case where the outer diameter of the shaft 11 is 6.5 mm or more and 7.0 mm or less and the distance L1 is less than 0.50 times the distance L2, the distance L1 decreases, and the distance between the upper end of the upper annular member 41a and the lower end of the screw part 110a decreases. As a result, when the screw 90 is screwed into the screw hole 11a, the vicinity of the screw hole 11a is deformed, and the axial center is displaced, and thus the shaft wobbling is likely to occur.

Further, in the disk driving device 1, the distance between the lower end of the shaft 11 fixed to the base part 71 and the lower annular member 41b increases. As a result, in the lower portion of the shaft 11, the supporting rigidity of the shaft 11 with respect to the rotor 30 is reduced, and when the spindle motor 10 is driven, vibration and noise increase (excitation response deteriorates). In addition, in a case where the distance L1 decreases and the center of gravity of the rotor 30 is disposed apart from and higher than the axially central portion of the disk driving device 1 in the axial direction, the rotational stability of the spindle motor 10 is reduced and the excitation response further deteriorates.

Further, by setting the distance L1 to 8.5 mm or more, the lengths of the screw hole 11a and the screw part 110a are able to be kept constant while the lower end of the screw part 110a is disposed higher than the upper end of the upper annular member 41a in the axial direction. As a result, the shaft 11 and the cover part 72 are able to be more firmly fastened to each other via the screw 90.

When a driving current is supplied to the coil 22, magnetic flux is generated in the plurality of teeth 21a. A torque in a circumferential direction is generated due to interaction of the magnetic flux between the teeth 21a and the magnet 32. As a result, the rotor 30 rotates about the center axis C with respect to the stator 20. The disk 50 supported by the hub member 31 is rotated about the center axis C together with the rotor 30.

At this time, when the sleeve 42 is rotationally driven with respect to the upper annular member 41a and the lower annular member 41b, the first dynamic pressure grooves 421, the second dynamic pressure grooves 422, the third dynamic pressure grooves 423, and the fourth dynamic pressure grooves 424 induce a fluid dynamic pressure in the lubricating oil 43, with which the minute gap S is filled, by pumping action. As a result, the sleeve 42 is supported in the radial direction and the axial direction without contact with the upper annular member 41a and the lower annular member 41b and is able to be smoothly rotated with respect to the upper annular member 41a, the lower annular member 41b, and the shaft 11 at high speed.

(3. Detailed Configuration of Base Part)

Figure 4:
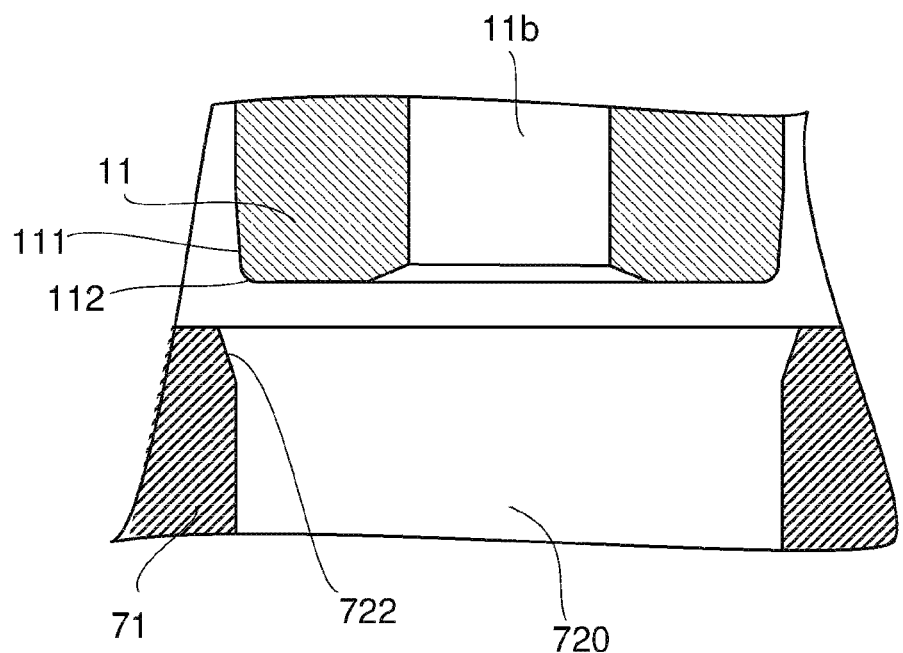
FIG. 4 is a longitudinal sectional view showing an enlarged portion of a base part of the motor according to the embodiment of the present invention.

FIG. 4 is a longitudinal sectional view showing an enlarged portion of the base part 71. The through hole 720 has a hole inclined portion 722 at an upper end portion thereof, an inner diameter of which decreases toward an axially lower side. Further, the shaft 11 has a curved surface portion 112 and a shaft inclined portion 111. The curved surface portion 112 is defined in a curved surface shape at a radially outer end portion of the lower end of the shaft 11. The shaft inclined portion 111 is defined continuously with an upper end portion of the curved surface portion 112 and has an outer diameter that increases toward an axially upper side.

When the shaft 11 is press-fitted into the through hole 720, even if there is a deviation in press-fitting angle, it is possible to correct the press-fitting angle of the shaft 11 by the curved surface portion 112. Further, after the press-fitting angle is corrected at the curved surface portion 112, the shaft 11 is press-fitted into the through hole 720 while being guided at an appropriate angle by the shaft inclined portion 111. As a result, it is possible to reduce the occurrence of shaft wobbling of the shaft 11 and improve the press-fitting workability.

Furthermore, by defining the hole inclined portion 722 also on a side of the through hole 720, it is possible to correct the press-fitting angle of the shaft 11 more easily when the curved surface portion 112 of the shaft 11 passes through the hole inclined portion 722.

Next, the effects of the present invention will be specifically described using examples and comparative examples. In the following experiments, simulation evaluation of the excitation response of the spindle motor 10 was performed with the spindle motor 10 mounted on the disk driving device 1.

First, the excitation response of the spindle motor 10 in a case where the outer diameter of the shaft 11 is 6.5 mm was evaluated. According to Example 1, Example 2, Example 3, Example 4, Comparative Example 1, and Comparative Example 2, which will be described below, the outer diameter of the shaft 11 is 6.5 mm, and the distance L2 is 16.3 mm. In Example 1, the distance L1 is 0.50 times the distance L2. In Example 2, the distance L1 is 0.60 times the distance L2. In Example 3, the distance L1 is 0.70 times the distance L2. In Example 4, the distance L1 is 0.80 times the distance L2. Further, in Example 1, Example 2, Example 3, and Example 4, the upper end of the upper annular member 41a is located lower than the lower end of the screw part 110a in the axial direction.

In Comparative Example 1, the distance L1 is 0.40 times the distance L2. In Comparative Example 2, the distance L1 is 0.90 times the distance L2. In Comparative Example 1, the upper end of the upper annular member 41a is located higher than the lower end of the screw part 110a in the axial direction.

Figure 5:
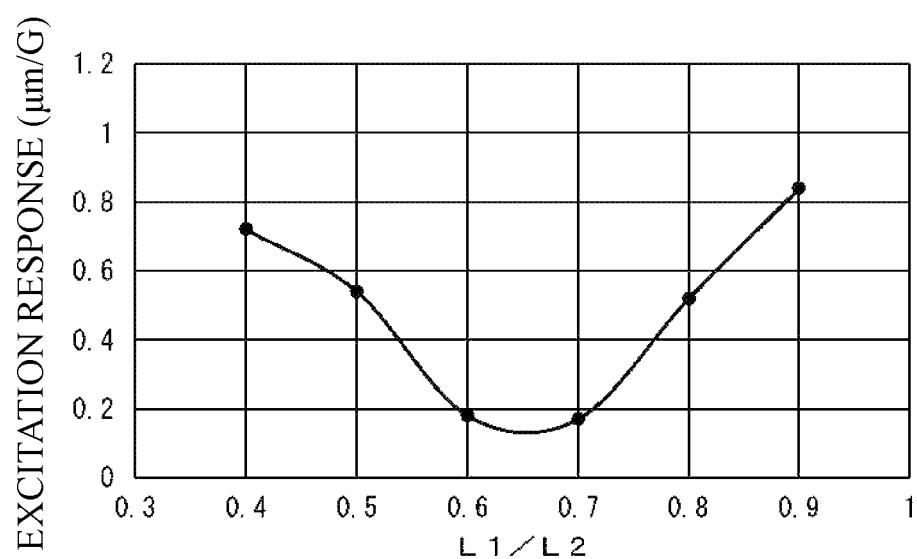
FIG. 5 is a graph showing evaluation results of excitation response of the motor according to the embodiment of the present invention.

Table 1 and FIG. 5 show the evaluation results of the excitation response of the spindle motor 10 of each of Example 1, Example 2, Example 3, Example 4, Comparative Example 1, and Comparative Example 2.

TABLE 1

|  | Comparative Example 1 | Example 1 | Example 2 | Example 3 | Example 4 | Comparative Example 2 |
|---|---|---|---|---|---|---|
| L1/L2 | 0.40 times | 0.50 times | 0.60 times | 0.70 times | 0.80 times | 0.90 times |
| Excitation response | 0.72 | 0.54 | 0.18 | 0.17 | 0.52 | 0.84 |

As shown in Table 1 and FIG. 5, the excitation response of each of Example 1, Example 2, Example 3, and Example 4 is 0.6 (um/G) or less, which is superior to that of each of Comparative Example 1 and Comparative Example 2. Further, the excitation response of each of Example 2 and Example 3 is superior to the excitation response of each of Example 1 and Example 4.

As a result, it was found that in a case where the outer diameter of the shaft 11 is 6.5 mm or more and 7.0 mm or less and the distance L1 is 0.50 times or more and 0.80 times or less the distance L2, the excitation response is excellent.

Next, the excitation response in a case where the outer diameter of the shaft 11 is 6.0 mm was evaluated. Further, according to Example 5, Example 6, Example 7, Comparative Example 3, and Comparative Example 4, the outer diameter of the shaft 11 is 6.0 mm, and the distance L2 is 15.5 mm. In Example 5, the distance L1 is 0.60 times the distance L2. In Example 6, the distance L1 is 0.70 times the distance L2. In Example 7, the distance L1 is 0.80 times the distance L2. Further, in Example 5, Example 6, and Example 7, the upper end of the upper annular member 41a is located lower than the lower end of the screw part 110a in the axial direction.

In Comparative Example 3, the distance L1 is 0.50 times the distance L2. In Comparative Example 4, the distance L1 is 0.90 times the distance L2. In addition, in Comparative Example 3, the upper end of the upper annular member 41a is located higher than the lower end of the screw part 110a in the axial direction.

Figure 6:
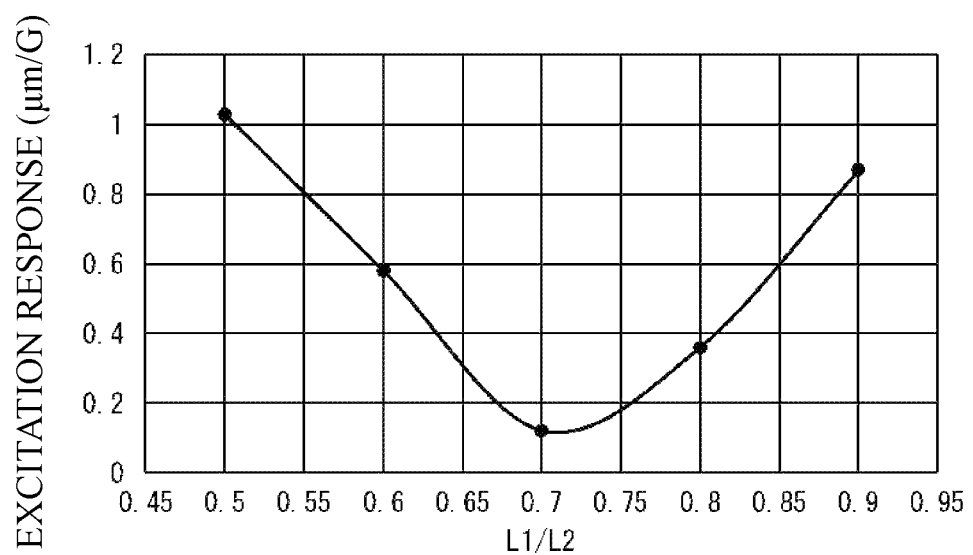
FIG. 6 is a graph showing evaluation results of excitation response of the motor according to the embodiment of the present invention.

Table 2 and FIG. 6 show the evaluation results of the excitation response of the spindle motor 10 of each of Example 5, Example 6, Example 7, Comparative Example 3, and Comparative Example 4.

TABLE 2

|  | Comparative Example 3 | Example 5 | Example 6 | Example 7 | Comparative Example 4 |
|---|---|---|---|---|---|
| L1/L2 | 0.50 times | 0.60 times | 0.70 times | 0.80 times | 0.90 times |
| Excitation response | 1.03 | 0.58 | 0.12 | 0.36 | 0.87 |

As shown in Table 2 and FIG. 6, the excitation response of each of Example 5, Example 6, and Example 7 is 0.6 or less, which is superior to that of each of Comparative Example 3 and Comparative Example 4. Further, from FIG. 6, even in a case where the distance L1 is 0.85 times the distance L2, the excitation response is 0.6 or less, which is excellent in excitation response.

As a result, it was found that in a case where the outer diameter of the shaft 11 is 6.0 mm or more and less than 6.5 mm and the distance L1 is 0.60 times or more and 0.85 times or less the distance L2, the excitation response is excellent.

According to the present invention, it is able to be used for, for example, a housing used in a disk driving device such as a hard disk drive.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A spindle motor comprising:
a shaft that extends along a center axis extending in a vertical direction;
a base part that has a through hole to which a lower end portion of the shaft is fixed;
a stator core in an annular shape that is disposed on an upper surface of the base part and surrounds the shaft;
a rotor that rotates around the center axis; and
a bearing part that rotatably supports the rotor with the shaft as a center axis,
wherein the shaft has a screw hole extending axially downward from an upper end of the shaft,
wherein the screw hole has a screw part onto which a screw is screwed,
wherein the bearing part includes:
an upper annular member and a lower annular member which protrude radially outward from an outer peripheral surface of the shaft and are disposed to be spaced apart from each other in an axial direction; and
a sleeve in a cylindrical shape that has an insertion hole into which the shaft is inserted, covers the outer peripheral surface of the shaft, and extends in the axial direction, and
wherein an upper end of the upper annular member is disposed lower than a lower end of the screw part in the axial direction.

2. The spindle motor according to claim 1,
wherein the sleeve has:
an upper inner peripheral surface that radially faces the upper annular member and is inclined axially upward in a direction away from the shaft; and
a lower inner peripheral surface that radially faces the lower annular member and is inclined axially downward in a direction away from the shaft,
wherein the upper inner peripheral surface has first dynamic pressure grooves and second dynamic pressure grooves which are disposed adjacent to each other in the axial direction and are respectively defined in plurality in a circumferential direction,
wherein the first dynamic pressure grooves and the second dynamic pressure grooves are inclined axially upward in different directions in the circumferential direction,
wherein the lower inner peripheral surface has third dynamic pressure grooves and fourth dynamic pressure grooves which are disposed adjacent to each other in the axial direction and are respectively defined in plurality in the circumferential direction,
wherein the third dynamic pressure grooves and the fourth dynamic pressure grooves are inclined axially upward in different directions in the circumferential direction,
wherein the shaft has an outer diameter of 5.5 mm or more and less than 6.5 mm, and
wherein a distance in the axial direction between a boundary between the first dynamic pressure grooves and the second dynamic pressure grooves and the upper end of the shaft is 0.60 times or more and 0.85 times or less a distance in the axial direction between the boundary between the first dynamic pressure grooves and the second dynamic pressure grooves and a boundary between the third dynamic pressure grooves and the fourth dynamic pressure grooves.

3. The spindle motor according to claim 1,
wherein the sleeve has:
an upper inner peripheral surface that radially faces the upper annular member and is inclined axially upward in a direction away from the shaft; and a lower inner peripheral surface that radially faces the lower annular member and is inclined axially downward in a direction away from the shaft, wherein the upper inner peripheral surface has first dynamic pressure grooves and second dynamic pressure grooves which are disposed adjacent to each other in the axial direction and are respectively defined in plurality in a circumferential direction, wherein the first dynamic pressure grooves and the second dynamic pressure grooves are inclined axially upward in different directions in the circumferential direction, wherein the lower inner peripheral surface has third dynamic pressure grooves and fourth dynamic pressure grooves which are disposed adjacent to each other in the axial direction and are respectively defined in plurality in the circumferential direction, wherein the third dynamic pressure grooves and the fourth dynamic pressure grooves are inclined axially upward in different directions in the circumferential direction, wherein the shaft has an outer diameter of 6.5 mm or more and 7.0 mm or less, and wherein a distance in the axial direction between a boundary between the first dynamic pressure grooves and the second dynamic pressure grooves and the upper end of the shaft is 0.50 times or more and 0.80 times or less a distance in the axial direction between the boundary between the first dynamic pressure grooves and the second dynamic pressure grooves and a boundary between the third dynamic pressure grooves and the fourth dynamic pressure grooves.

4. The spindle motor according to claim 1, wherein a lower end of the lower annular member is disposed higher than an upper end of the stator core in the axial direction.

5. The spindle motor according to claim 1,
wherein the base part has an annular protruding portion in an annular shape that protrudes axially upward from the upper surface of the base part and surrounds the shaft,
wherein the stator core is held on an outer peripheral surface of the annular protruding portion, and
wherein a radially inner end of the annular protruding portion overlaps at least a portion of the upper annular member and the lower annular member when viewed in the axial direction.

6. The spindle motor according to claim 1, wherein the shaft has a hollow hole that extends axially upward from a lower end of the shaft.

7. The spindle motor according to claim 6, wherein an upper end of the hollow hole is disposed higher than an upper end of the through hole in the axial direction.

8. The spindle motor according to claim 6, wherein a lower end of the lower annular member is disposed higher than an upper end of the hollow hole in the axial direction.

9. The spindle motor according to claim 6, wherein an upper end of the hollow hole is disposed at a position overlapping the stator core in a radial direction.

10. The spindle motor according to claim 1, wherein the shaft has:
a curved surface portion that is defined in a curved surface shape at a radially outer end portion of a lower end of the shaft; and
a shaft inclined portion that is defined continuously with an upper end portion of the curved surface portion and has an outer diameter that increases toward an axially upper side.

11. The spindle motor according to claim 1, wherein the shaft has an outer diameter of 5.5 mm or more and 7.0 mm or less.

12. The spindle motor according to claim 2, wherein the distance in the axial direction between the boundary between the first dynamic pressure grooves and the second dynamic pressure grooves and the upper end of the shaft is 8.5 mm or more.

13. The spindle motor according to claim 1, wherein the through hole has a hole inclined portion at an upper end portion of the through hole, and an inner diameter of the hole inclined portion decreases toward an axially lower side.

14. A disk driving device comprising:
the spindle motor according to claim 1;
a disk that is rotated about the center axis by the spindle motor;
an access part that performs at least one of reading and writing information with respect to the disk; and
a housing that houses the spindle motor, the disk, and the access part.

15. The disk driving device according to claim 14, wherein an inside of the housing is filled with a gas having a density lower than that of air.

* * * * *